United States Patent
Sasagawa

[19]

[11] Patent Number: 5,933,262
[45] Date of Patent: Aug. 3, 1999

[54] OPTICAL AMPLIFICATION DEVICE AND WAVELENGTH MULTIPLEXED LIGHT TRANSFER APPARATUS USING THE SAME

[75] Inventor: Miwa Sasagawa, Tokyo, Japan

[73] Assignee: NEC Corporation, Tokyo, Japan

[21] Appl. No.: 08/840,135

[22] Filed: Apr. 11, 1997

[30] Foreign Application Priority Data

Apr. 23, 1996 [JP] Japan .................................. 8-100911

[51] Int. Cl.[6] .......................... H04J 14/02; H04B 10/02; H04B 10/16; H04B 10/12
[52] U.S. Cl. ......................... 359/127; 359/127; 359/177; 359/179; 359/173; 359/174
[58] Field of Search .................................... 359/177, 179, 359/173, 174, 127

[56] References Cited

U.S. PATENT DOCUMENTS

| | | | |
|---|---|---|---|
| 5,510,926 | 4/1996 | Bayart et al. | 359/179 |
| 5,600,473 | 2/1997 | Huber | 359/179 |
| 5,644,423 | 7/1997 | Iwano | 359/337 |
| 5,680,246 | 10/1997 | Takahashi et al. | 359/341 |

OTHER PUBLICATIONS

Japanese Office Action dated Jun. 2, 1998 with English language translation of Japanese Examiner's comments.

*Primary Examiner*—Jason Chan
*Assistant Examiner*—Mohammad Sedighian
*Attorney, Agent, or Firm*—Whitham, Curtis & Whitham

[57] ABSTRACT

Provided are an optical amplifier, for amplifying a light signal; first and second light dividers, optically connected to an output terminal of the optical amplifier; and first and second light receivers, for receiving light divided by these light dividers. A variable wavelength filter is located between the first optical coupler and the second optical couler. In addition, provided are a filter driver, for sweeping a center wavelength that passes through the variable wavelength filter; a counter circuit, for counting output peaks of the second light receiver; and an output controller, for controlling an output of the optical amplifier so as to maintain a constant output by the first light receiver. The output controller employs a voltage output by the count circuit as a reference voltage for controlling changes in the light output power of the optical amplifier that are in consonance with the value held by the counter, i.e., in consonance with the number of signal light wavelengths. When the number of multiplexed wavelengths is changed, a constant output level for one wavelength can be maintained.

10 Claims, 5 Drawing Sheets

OPTICAL AMPLIFICATION DEVICE AND WAVELENGTH MULTIPLEXED LIGHT TRANSFER APPARATUS USING THE SAME

BACKGROUND OF THE INVENTION

1. Field of the Invention

The present invention relates to an optical amplification device; and in particular, to an optical amplification apparatus for amplifying a plurality of light signals having different multiplexed wavelengths, and to a wavelength multiplexed light transfer apparatus for using this optical amplification device.

2. Related Arts

A system that has recently become popular provides for the increasing of the capacity of transfer data by employing multiplexing wavelengths of light signals having different wavelengths and inputting them to a signal transfer path. The light transfer system, which has a large capacity, requires the inclusion of a direct optical amplification device, such as an optical fiber amplification device, in order to reduce the costs of a relay device.

For an optical fiber amplification device that is currently employed, a light divider is provided at the output portion of an optical fiber amplifier in order to maintain a constant light output, and the light output is so controlled that a constant light input level is maintained at a light receiver connected to the light divider. Such a structure is well known wherein, when a plurality of light signals having different wavelengths are wavelength multiplexed signals, a dummy light is superimposed on the multiplexed light signals in addition to the wavelengths of their light signals, and a constant output by an optical amplifier is maintained by using a dummy light power level at the output portion of the optical amplifier. This structure is described in Japanese Patent Application No. Hei 4-78827, for example.

When a conventional optical fiber amplification device is employed for a wavelength multiplexed light communication device, a constant sum for the output levels of wavelength multiplexed light signals is maintained. Thus, if the number of multiplexed light wavelengths to be transferred is increased or reduced, due to the provision of more light transmitters or due to the abnormal functioning of a light transmitter, a signal light level for one wavelength of a light signal to be transferred is reduced or increased. A reduction or an increase in the signal level of one wavelength will result in the deterioration of the light signal transfer operation.

The wavelength multiplexed light transfer device, therefore, must maintain a constant transfer output level for light signals having different wavelengths. However, since the conventional optical fiber amplification device maintains a constant total for the light output power, when the number of multiplexed wavelengths is changed, the transfer output levels for the wavelengths are altered and degradation of the transfer characteristic occurs.

With the above structure wherein a dummy light is superimposed on the light signal, the manufacturing costs are increased because a dummy light generator is required for a transmitter. In addition, when the dummy light generator malfunctions, the operation of the optical amplification device becomes unstable.

SUMMARY OF THE INVENTION

It is, therefore, one object of the present invention to provide an optical amplification device that can, even when the number of multiplexed wavelengths is changed, stably and constantly control an output level for each wavelength.

To achieve the above object, according to the present invention, an optical amplification device comprises:

an optical amplifier, for amplifying a multiplexed light signal obtained by multiplexing wavelengths of a plurality of light signals having different wavelengths and for outputting an amplified light signal;

a peak output count circuit, for detecting a peak output count for the amplified light signal; and an output controller, for controlling an output of the optical amplifier in consonance with the peak output count. Although the present invention implements stable optical amplification for light signals having multiplexed wavelengths, the present invention can be applied for optical amplification of light signals having the same wavelength.

Further, according to the present invention, an optical amplification device comprises:

a first optical amplifier, for amplifying a multiplexed light signal and for outputting an amplified light signal;

a first optical coupler, for branching one part of the amplified light signal and for outputting a first branching light signal;

a second optical couplre, for branching one part of the amplified light signal and for outputting a second branching light signal; and a first light receiver, for, upon receipt of the first branching light signal, converting the first branching light signal into a first electric signal. Included in addition are a wavelength variable filter, a second light receiver, a filter driver, a count circuit, a reference value setting circuit and an output controller.

The wavelength variable filter selectively transmits light in a specific wavelength band from the second branching light signal, and outputs a selected branching signal. The second light receiver receives the selected branching light signal, and converts the selected branching light signal into a second electric signal. The filter driver sweeps a transmission center wavelength of the wavelength variable filter. The count circuit detects a peak output count for the second electric signal, and outputs a count signal in consonance with the peak output count. The reference value setting circuit sets a reference value for an output of the optical amplifier based on the count signal. The output controller controls the output of the optical amplifier so that the first electric signal is constant relative to the reference value.

In the above arrangement, both the first optical coupler and the second optical coupler are located along a light transfer path. The second optical coupler can be located on the branch leading from the first optical coupler.

The first optical coupler is located between the second optical coupler and the wavelength variable filter. As another example structure, the second optical coupler can be located on an input side of the optical amplifier. A width of a wavelength band of the wavelength variable filter is so set that the width is narrower than an interval between wavelengths of the multiplexed light signals that are adjacent to each other.

The optical amplification device of the present invention further comprises a second optical amplifier connected in series with the first optical amplifier, and located between the first optical amplifier and the second optical amplifier. In the arrangement of the optical amplifier of the present invention, the wavelength variable filter includes an interference film filter, a Fabry-Pérot etalon, or a waveguide.

Moreover, according to the present invention, a wavelength multiplexed light transfer apparatus comprises:

a light transmission device, including a light transmitter for transmitting a plurality of light signals having different wavelengths, and a light synthesizer, for multiplexing wavelengths of the plurality of light signals and for transmitting a multiplexed light signal to one end of a light transfer path;

a light reception device, including a wavelength separator for separating the multiplexed light signal output at the other end of the light transfer path and for outputting a wavelength separation light signal, and a light receiver, for receiving the wavelength separation signal; and an optical amplification device that is located between the light transmission apparatus and the light reception apparatus. The optical amplification device includes an optical amplifier, for outputting an amplification light signal employed for amplifying the multiplexed signal; a peak output count circuit, for detecting a peak output count for the amplification light signal; and an output controller, for controlling an output of the optical amplifier in consonance with the peak output count.

Furthermore, according-to the present invention, a wavelength multiplexed light transfer apparatus comprises the light transmission device, the light reception device, and the light amplification device described above. The light optical amplification device comprises:

a first optical amplifier, for amplifying a multiplexed light signal and for outputting an amplified light signal;

a first optical coupler, for branching one part of the amplified light signal and for outputting a first branching light signal;

a second optical coupler; for branching one part of the amplified light signal and for outputting a second branching light signal; and a first light receiver, for, upon receipt of the first branching light signal, converting the first branching light signal into a first electric signal. Included in addition are a wavelength variable filter, a second light receiver, a filter driver, a count circuit, a reference value setting circuit and an output controller.

The wavelength separator has a third light separator for dividing input light and outputting a branch light, and a light band transmission filter for selecting from the branch light a specific wavelength and for transmitting light having the specific wavelength.

According to the optical amplification device of the present invention, one part of an amplified wavelength multiplexed light signal branches and is transmitted to the wavelength variable filter. The number of wavelengths of the light signal is counted as the number of transmitted light peaks by sweeping the transmission center wavelength of the wavelength variable filter. As a result, a reference voltage for the light output controller is changed.

BRIEF DESCRIPTION OF THE DRAWINGS

The above, and other objects, features, and advantages of the present invention will become apparent during the course of the following detailed description, given while referring to the accompanying drawings, wherein.

DETAILED DESCRIPTION OF THE PREFERRED EMBODIMENTS

The present invention will now be described while referring to the accompanying drawings.

Figure 1:
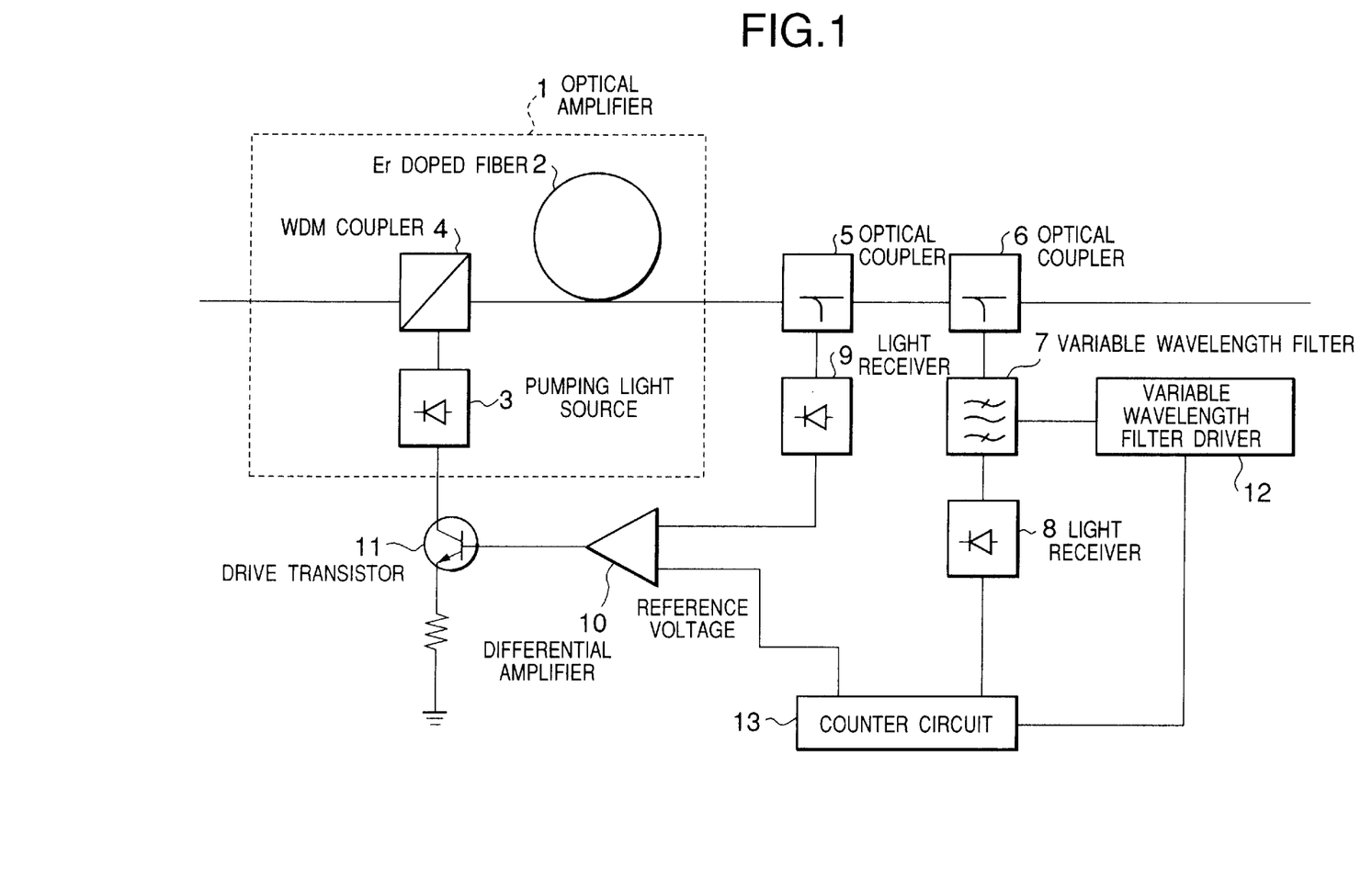
FIG. 1 is a diagram illustrating the arrangement of an optical amplification device according to a first embodiment of the present invention.

FIG. 1 is a diagram illustrating an optical amplification device according to a first embodiment of the present invention. An optical amplifier 1 includes an erbium (Er) doped fiber 2, a pumping light source 3, and a wavelength division multiplexer (WDM) 4. A multiplexed wavelength signal light is amplified by the optical amplifier 1 and is output to a light transfer path via a first optical coupler 5 and a second optical coupler 6. The light branched by the second optical coupler 6 is guided to a light receiver 8 via a variable wavelength filter 7, and the light branched by the first optical coupler 5 is guided to a light receiver 9.

The output of the light receiver 9 is fed back to a pumping light source drive transistor 11 by a differential amplifier 10, in the optical amplifier 1, so that the level of the output equals to a reference voltage. Since all the multiplexed wavelength light signals are input to the light receiver 9, the differential amplifier 10 performs feedback control so that a constant light power is maintained without taking into consideration the number of light signals.

The variable wavelength filter 7 is controlled by a filter driver 12 for repeatedly sweeping the transmission wavelength center in a wavelength band of a multiplexed wavelength light signal. The output of the light receiver 8 is transmitted to a count circuit 13. The count circuit 13 counts the number of output peaks of the light receiver 8, and a voltage that is proportional to the count is output to the reference voltage terminal of the differential amplifier 10.

Light power that enters the light receiver 8 peaks each time the center transmission wavelength of the variable wavelength filter 7 matches the signal light wavelength. Therefore, the number of light signals included in the multiplexed wavelength light signal can be acquired by counting the number of output peaks for the light receiver 8 in a period within which the center transmission wavelength of the variable wavelength filter 7 is swept one time.

Figure 2:
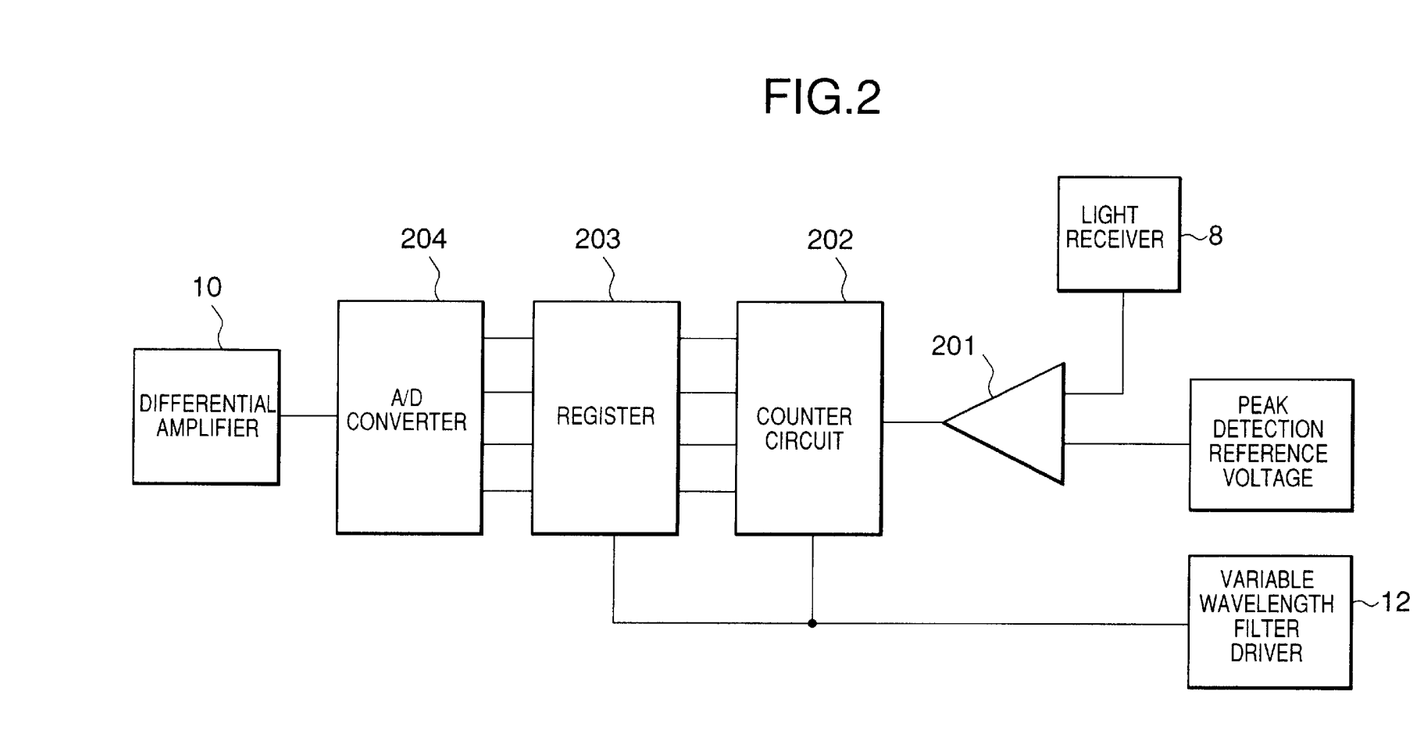
FIG. 2 is a diagram showing an example arrangement of a count circuit for counting peaks of output received by the optical amplification device of the present invention.

FIG. 2 is a diagram illustrating an example structure of the count circuit for counting the number of peaks in the output received by the light receiver 8. An electric signal from the light receiver 8 is compared with a peak detection reference voltage by a comparator 201, and one pulse per peak is transmitted to a counter circuit 202. The counter circuit 202 counts the received pulses and outputs the result to a register 203.

The count value obtained by the counter circuit 202 is stored in the register 203 using a leading waveform of a synchronous signal from the variable wavelength filter driver 12, and is cleared using a trailing waveform of the synchronous signal. The data stored in the receiver 203 is converted into an analog signal by an A/D converter 204. The analog signal is output to the reference voltage terminal of the differential amplifier 10, changing the output power of the pumping light source 3.

Figure 3A:
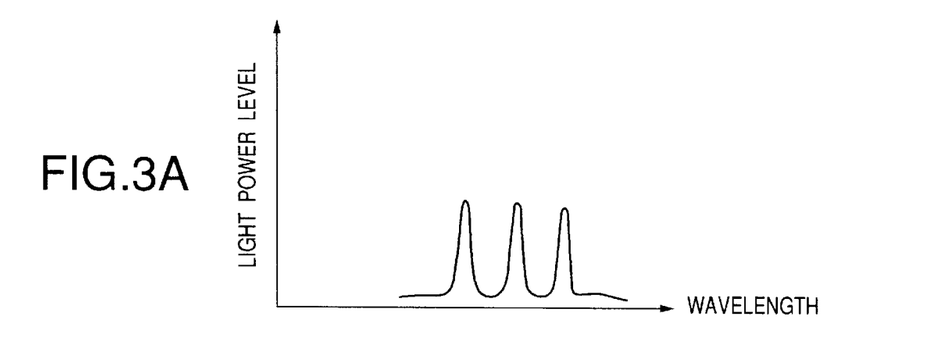
FIGS. 3A, 3B and 3C are graphs showing the spectra of a light signal, with FIG. 3A showing the spectrum of a light signal input at an optical amplifier, with FIG. 3B showing the spectrum of a light signal that is amplified by the optical amplifier before it is input to a wavelength variable filter, and FIG. 3C showing the relationship between a wavelength and light power obtained by sweeping a passed wavelength band of the wavelength variable filter.
Figure 3B:
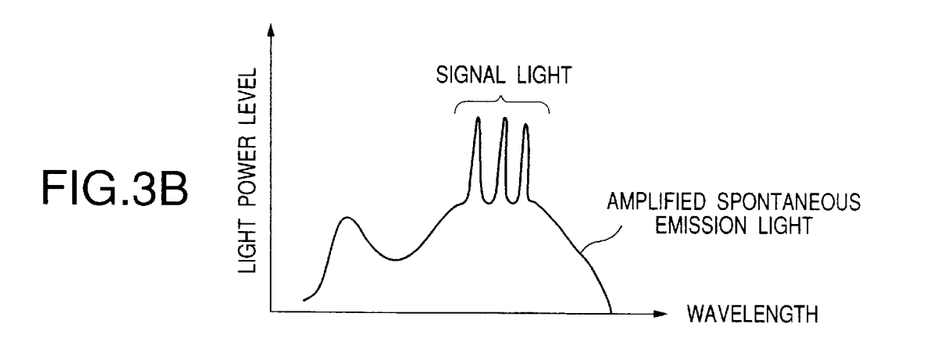
Figure 3C:
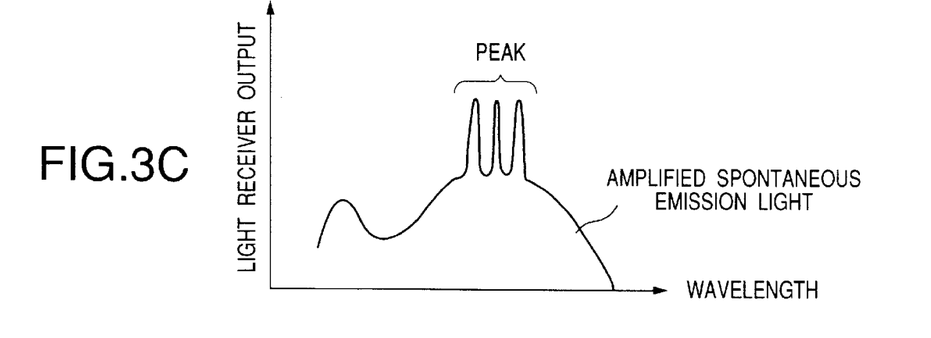

Referring back to FIG. 1, an explanation will be given for the conditions for a light signal in the individual sections of the optical amplification device of the present invention. FIGS. 3A, 3B and 3C are graphs showing spectra of light signals input to the optical amplification apparatus in FIG. 1. To simplify the explanation, an example is shown wherein light signals having three wavelengths are multiplexed.

In FIG. 3A is shown a spectrum of a light signal input to the optical amplifier 1, and in FIG. 3B is shown a spectrum of a light signal that is amplified by the optical amplifier 1 before being input to the waveform variable filter 7. The spectrum of the amplified light signal includes amplified spontaneous emission (ASE) light.

For a light signal that is input while the wavelength set by the wavelength variable filter driver 12 is employed as the center wavelength, the variable waveform filter 7 transmits only light in a wavelength band having a predetermined width. When the center wavelength of the driver 12 is swept, a light signal that passes through the variable wavelength filter 7 is converted into an electric signal by the light receiver 8, and the light power levels are monitored sequentially in order, and the correlation between the wavelength and the light power can be obtained. To detect the peak count for a light signal, the wavelength band to be swept must be sufficiently narrow. If its width is greater than the wavelength width between adjacent light signals, accurately detecting a peak count is difficult.

In this embodiment, three light signals having wavelengths of 1552.54 nm, 1555.75 nm and 1558.97 nm are multiplexed, and the obtained multiplexed light signal is swept while the wavelength band width of the wavelength variable filter 7 is set to 1 nm.

In FIG. 3C is shown the relationship between the wavelength, which is obtained by sweeping the passing wavelength band of the variable wavelength filter 7, and the light power. The electric signal is transmitted to the counter circuit 13 and the output peak count is detected. In FIG. 3C, peak count 3 is detected. The optical amplification device of the present invention sets a reference voltage for the differential amplifier 10 that is in consonance with this peak count.

According to the present invention, when the signal light wavelength is changed from N to M, for example, through the control exercised by the optical amplification device, the voltage supplied by the count circuit 13, which is applied to the reference voltage terminal of the differential amplifier 10, and the value of the total light power, which is input to the light receiver 9, are multiplied by M/N. As a result, for an N wave and for an M wave, a constant light power is maintained for one wavelength of a light signal that is transmitted to the light transfer path.

An optical amplification device according to a second embodiment of the present invention will now be described.

Figure 4:
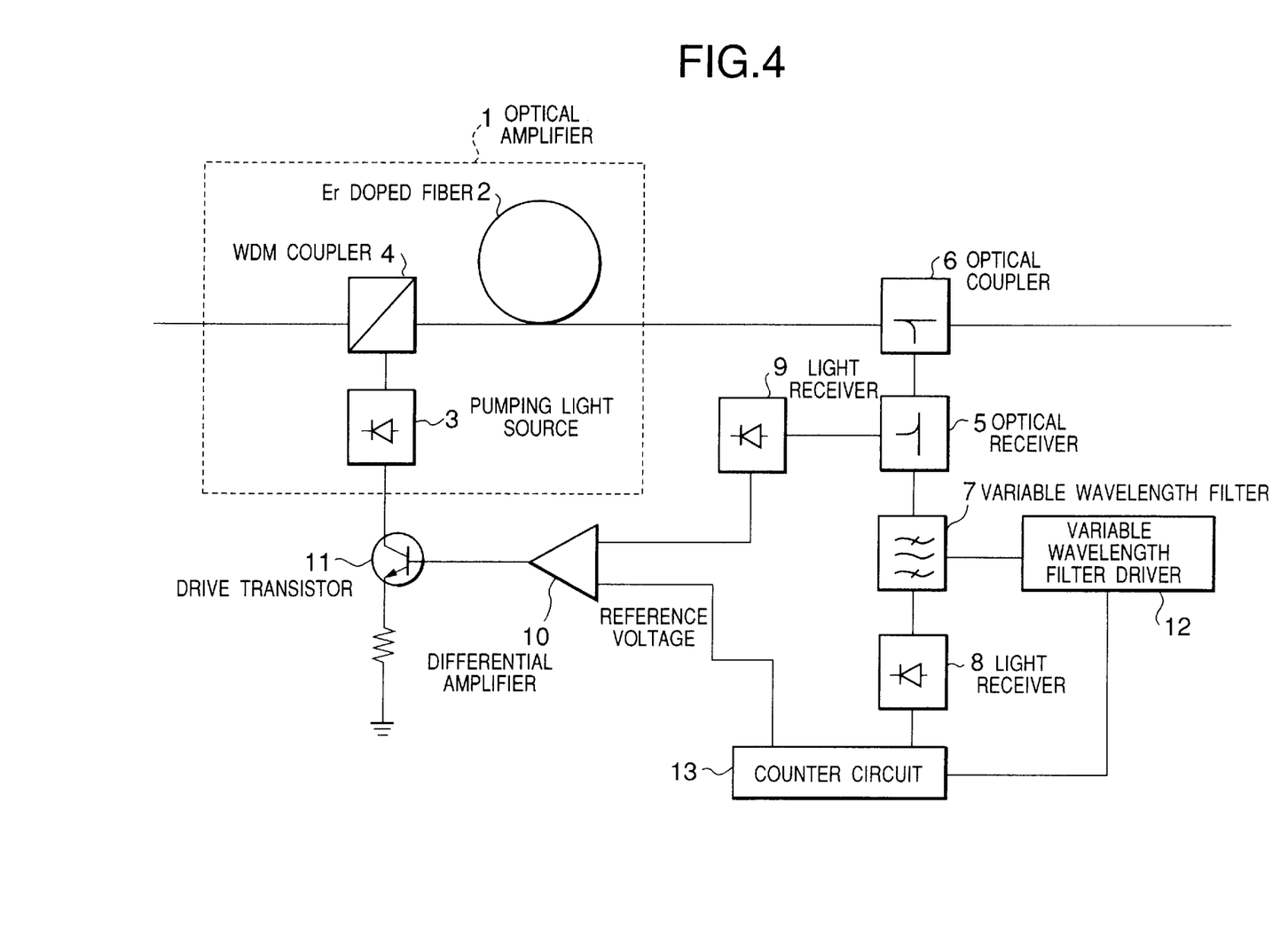
FIG. 4 is a diagram illustrating an optical amplification device according to a second embodiment of the present invention.

FIG. 4 is a diagram illustrating the arrangement of an optical amplification device according to the second embodiment of the present invention. In this embodiment, a light divider 5, for controlling the total light power output, is inserted between a light divider 6 and a variable wavelength filter 7. The basic operation is the same as that in the first embodiment. Since the number of optical components inserted between an optical amplifier 1 and a light transfer path is reduced by employing the arrangement in this embodiment, the light output power that the optical amplifier 1 requires to transmit the necessary light power to the light transfer path can be reduced, compared with when the arrangement of the first embodiment in FIG. 1 is employed.

The light dividers 5 and 6 can be inserted into the signal light input section of the optical amplifier. When there are two stages for an optical amplifier 1, the optical couplre 6 can be located between the two optical amplifiers.

Although an optical fiber amplifier is employed as the optical amplifier 1 in the second embodiment, a semiconductor optical amplifier can be used as an optical amplifier 1.

The variable wavelength filter 7 can be one that employs an interference film filter having a dielectric multi-layer film, a Fabry-Pérot etalon, or a waveguide.

A multiplexed wavelength light transfer apparatus, to which the optical amplification device of the present invention is applied, will now be described.

Figure 5:
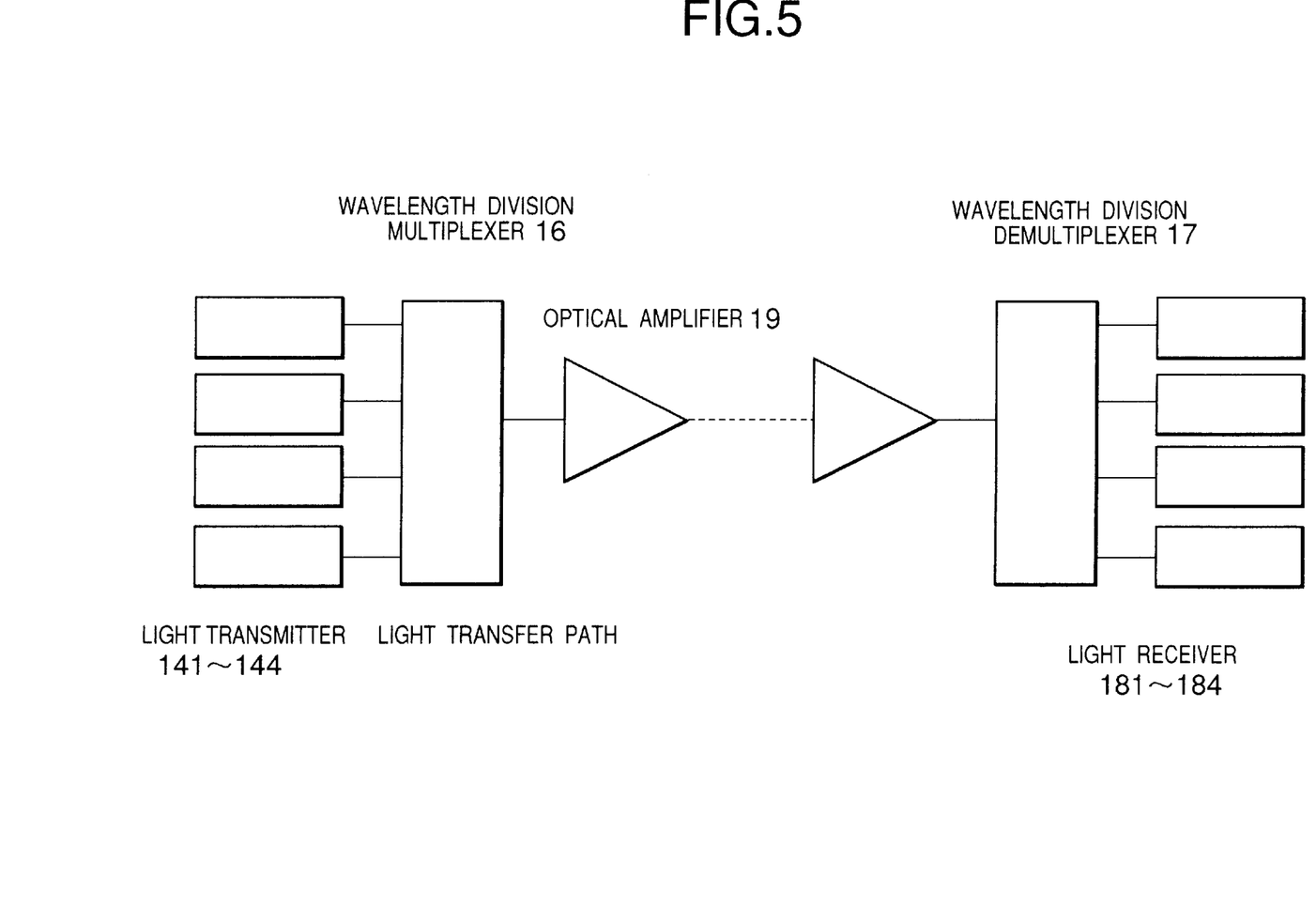
FIG. 5 is a diagram illustrating an example arrangement of a wavelength multiplexed light transfer apparatus using the optical amplification device of the present invention.

FIG. 5 is a diagram illustrating an example arrangement for a multiplexed wavelength light transfer apparatus employing the optical amplification device of the present invention. The multiplexed wavelength light transfer apparatus comprises light transmitters 141 to 144, for transmitting lights having different wavelengths; a wavelength division multiplexer 16, for transmitting light signals output by the light transmitters 141 to 144 to one end of a single light transfer path 15; a wavelength division demultiplexer 17, for demultiplexing, for each wavelength, a light signal output from the other end of the light transfer path 15, and for outputting the resultant signals; and light receivers 181 through 184, for receiving individual light signals output by the wavelength division demultiplexer 17. At least one optical amplification device 19, according to the present invention, is located between a light transmission unit, which includes the light transmitters 141 through 144, and a light reception unit, which includes the light receivers 181 through 184.

So long as the optical amplification device of the present invention is applied to a multiplexed wavelength light transfer apparatus that multiplexes light signals having different wavelengths, and that has relay devices, including an optical amplifier, stable optical amplification can be performed by the relay devices, regardless of the number of light signals to be multiplexed.

The wavelength division demultiplexer 17 can be constituted by a 1×4 light divider and a 4-light band pass filter.

When one part of a multiplexed wavelength light signal is obtained by amplification branches and is transmitted to the variable wavelength filter, and the center wavelength that passes through the variable wavelength filter is swept, the number of wavelengths of light is detected as the number of passed light peaks, and the reference voltage of the light output controller is changed. Therefore, even if the number of signal wavelengths input when a signal having multiple wavelengths is changed, a constant output level for each wavelength can be maintained.

While this invention has been provided as it relates to certain preferred embodiments, it should be understood that the subject matter encompassed by means of this invention is not limited to those specific embodiments. On the contrary, it is intended that the subject matter of the present invention include all alternative, modified and equivalent embodiments that can be considered as being representative of the spirit and scope of the following claims.

What is claimed is:

1. An optical amplification device comprising:

a first optical amplifier, for amplifying a multiplexed light signal that is obtained by multiplexing a wavelength of a single light signal, or wavelengths of a plurality of light signals having different wavelengths, and for outputting an amplified signal;

a first optical coupler, for branching one part of said amplified light signal and for outputting a first branching light signal;

a second optical coupler, for branching one part of said amplified light signal and for outputting a second branching light signal;

a first light receiver, for, upon receipt of said first branching light signal, converting said first branching light signal into a first electric signal;

a wavelength variable filter, for selectively transmitting light in a specific wavelength band from said second branching light signal, and for outputting a selected branching signal;

a second light receiver, for receiving said selected branching light signal, and for converting said selected branching light signal into a second electric signal;

a filter driver for sweeping a transmission center wavelength of said wavelength variable filter;

a count circuit for detecting a peak output count for said second electric signal, and for outputting a count signal in consonance with said peak output count;

a reference value setting circuit for setting a reference value for an output of said optical amplifier based on said count signal; and an output controller for controlling said output of said optical amplifier so that said first electric signal is constant relative to said reference value.

2. An optical amplification device according to claim 1, wherein said second light divider is located on an input side of said optical amplifier.

3. An optical amplification device according to claim 1, further comprising a second optical amplifier connected in series with said first optical amplifier, and located between said first optical amplifier and said second optical amplifier.

4. An optical amplification device according to claim 1, wherein a width of a wavelength band of said wavelength variable filter is so set that said width is narrower than an interval between wavelengths of said multiplexed light signals that are adjacent to each other.

5. An optical amplification device according to claim 1, wherein said wavelength variable filter includes an interference film filter.

6. An optical amplification device according to claim 1, wherein said wavelength variable filter includes a Fabry-Pérot etalon.

7. An optical amplification device according to claim 1, wherein said wavelength variable filter includes a waveguide.

8. A wavelength multiplexed light transfer apparatus, comprising:

a light transmission device, including a light transmitter for transmitting a plurality of light signals having different wavelengths, and a light synthesizer, for multiplexing wavelengths of said plurality of light signals and for transmitting a multiplexed light signal to one end of a light transfer path;

a light reception device, including wavelength separation means for separating said multiplexed light signal output at a second end of said light transfer path and for outputting a wavelength separation light signal, and a light receiver, for receiving said wavelength separation signal; and at least one optical amplification device that is located between said light transmission apparatus and said light reception apparatus, with said optical amplification device including:

a first optical amplifier, for amplifying said multiplexed light signal and for outputting an amplified signal;

a first optical coupler, for branching one part of said amplified light signal and for outputting a first branching light signal;

a second optical coupler, for branching one part of said amplified light signal and for outputting a second branching light signal;

a first light receiver, for, upon receipt of said first branching light signal, converting said first branching light signal into a first electric signal;

a wavelength variable filter, for selectively transmitting light in a specific wavelength band from said second branching light signal, and for outputting a selected branching signal;

a second light receiver, for receiving said selected branching light signal, and for converting said selected branching light signal into a second electric signal;

a filter driver for sweeping a transmission center wavelength of said wavelength variable filter;

a count circuit for detecting a peak output count for said second electric signal, and for outputting a count signal in consonance with said peak output count;

a reference value setting circuit for setting a reference value for an output of said optical amplifier based on said count signal; and an output controller for controlling said output of said optical amplifier so that said first electric signal is constant relative to said reference value.

9. A wavelength multiplexed light transfer apparatus comprising:

a light transmission device, including a light transmitter for transmitting a plurality of light signals having different wavelengths, and a light synthesizer, for multiplexing wavelengths of said plurality of light signals and for transmitting a multiplexed light signal to one end of a light transfer path;

a light reception device, including wavelength separation means for separating said multiplexed light signal output at the other end of said light transfer path and for outputting a wavelength separation light signal, and a light receiver, for receiving said wavelength separation signal; and at least one optical amplification device that is located between said light transmission apparatus and said light reception apparatus, with said optical amplification device including a first optical amplifier, for amplifying a multiplexed light signal that is obtained by multiplexing a wavelength of a single light signal, or wavelengths of a plurality of light signals having different wavelengths, and for outputting an amplified light signal and for outputting an amplified light signal, a first optical coupler, for branching one part of said amplified light signal and for outputting a first branching light signal, a second optical coupler, for branching one part of said amplified light signal and for outputting a second branching light signal, a first light receiver, for, upon receipt of said first branching light signal, converting said first branching light signal into a first electric signal, a wavelength variable filter, for selectively transmitting light in a specific wavelength band from said second branching light signal, and for outputting a selected branching signal, a second light receiver, for receiving said selected branching light signal, and for converting said selected branching light signal into a second electric signal, a filter driver for sweeping a transmission center wavelength of said wavelength variable filter, a counter circuit for detecting a peak output count for said second electric signal, and for outputting a count signal in consonance with said peak output count, a reference value setting circuit for setting a reference value for an output of said optical amplifier based on said count signal, and an output controller for controlling said output of said optical amplifier so that said first electric signal is constant relative to said reference value.

10. A wavelength multiplexed light transfer apparatus according to claim 8, wherein said wavelength separation means has a third light separator for dividing input light and outputting a branch light, and a light band transmission filter for selecting from said branch light a specific wavelength and for transmitting light having said specific wavelength.

* * * * *